United States Patent
Twist et al.

(10) Patent No.: US 9,585,020 B2
(45) Date of Patent: Feb. 28, 2017

(54) METHOD FOR THE REDUCTION OF SIGNALLING TRAFFIC ON MOBILE DEVICES

(71) Applicants: Andrew C. Twist, Cambridge (GB); Sean B. Pedley, Bristol (GB); Liam Murphy, Rochestown (IE)

(72) Inventors: Andrew C. Twist, Cambridge (GB); Sean B. Pedley, Bristol (GB); Liam Murphy, Rochestown (IE)

(73) Assignee: GOS Holding Limited, St. Helier, NJ (US)

( * ) Notice: Subject to any disclaimer, the term of this patent is extended or adjusted under 35 U.S.C. 154(b) by 25 days.

(21) Appl. No.: 14/434,426

(22) PCT Filed: Oct. 9, 2013

(86) PCT No.: PCT/EP2013/071101
§ 371 (c)(1),
(2) Date: Apr. 9, 2015

(87) PCT Pub. No.: WO2014/057007
PCT Pub. Date: Apr. 17, 2014

(65) Prior Publication Data
US 2015/0296380 A1    Oct. 15, 2015

(30) Foreign Application Priority Data
Oct. 9, 2012  (GB) .................................. 1218102.0

(51) Int. Cl.
*H04M 1/66* (2006.01)
*H04W 12/08* (2009.01)
*H04W 52/02* (2009.01)
*H04W 4/00* (2009.01)
*H04W 76/02* (2009.01)

(52) U.S. Cl.
CPC .......... *H04W 12/08* (2013.01); *H04W 4/003* (2013.01); *H04W 52/0251* (2013.01); *H04W 76/02* (2013.01)

(58) Field of Classification Search
CPC .......... G06F 13/00; H04L 43/16; H04L 67/32
USPC ....................................................... 455/411
See application file for complete search history.

(56) References Cited

U.S. PATENT DOCUMENTS

2008/0250419 A1    10/2008  Kasten et al.
2013/0060653 A1*   3/2013   Sharkey ................ H04L 69/321
                                                    705/26.3

OTHER PUBLICATIONS

Athivarapu et al., RadioJockey: mining program execution to optimize cellular radio usage, 2012 Article, Published in: Mobicom '12 Proceedings of the 18th annual international conference on Mobile computing and networking pp. 101-112 ACM New York, NY, USA © 2012 table of contents ISBN: 978-1-4503-1159-5.*

* cited by examiner

*Primary Examiner* — Thomas Lett
(74) *Attorney, Agent, or Firm* — Patti & Malvone Law Group, LLC

(57) ABSTRACT

The present application relates to mobile devices and in particular mobile devices which allow installed applications to connect to the Internet. The application addresses the problems associated with limited battery life and network congestion by controlling access to the Internet on each mobile device. The method intercepts requests to transmit IP data from applications and then determines whether they should be granted access.

19 Claims, 4 Drawing Sheets

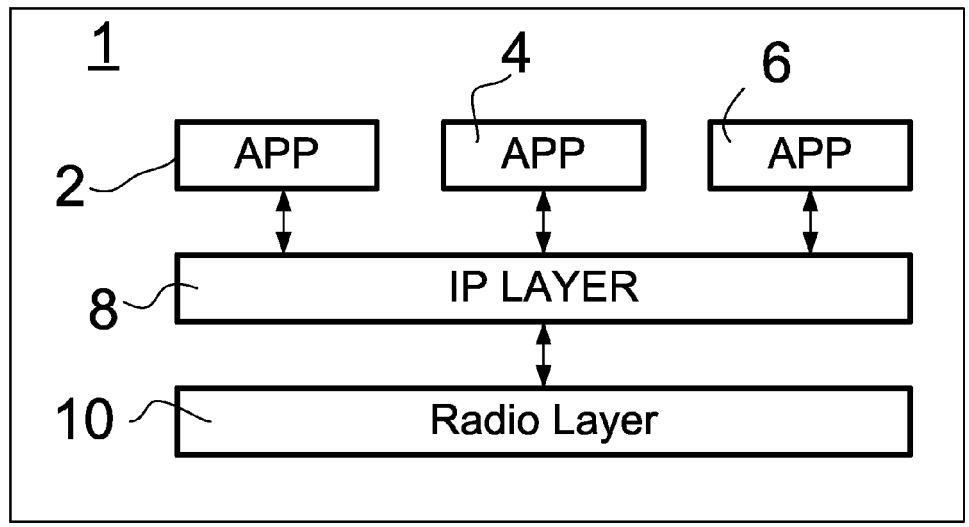
PRIOR ART  Fig. 1
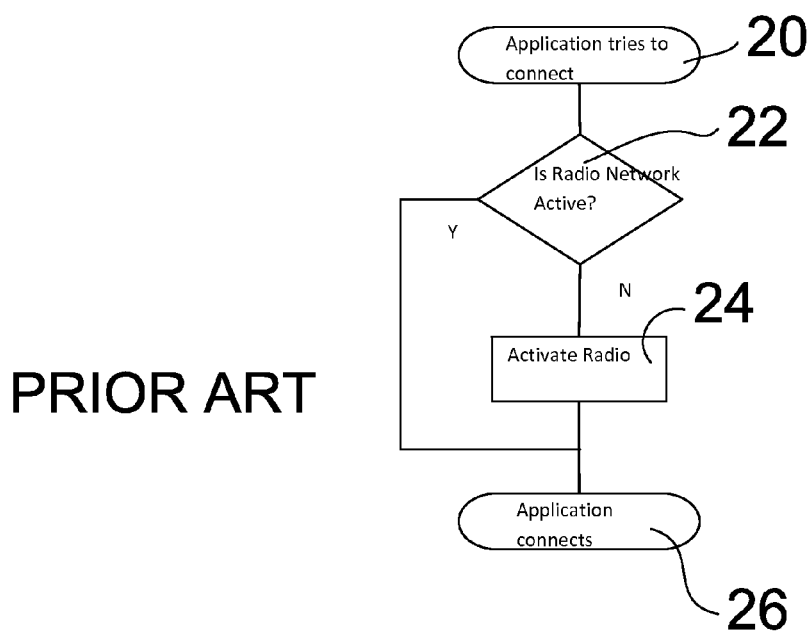
PRIOR ART
Fig. 2

METHOD FOR THE REDUCTION OF SIGNALLING TRAFFIC ON MOBILE DEVICES

FIELD OF THE INVENTION

The present application relates to mobile communications devices and more specifically to transmission of data from these devices.

BACKGROUND

The development of smart phones in association with development of 3G and 4G networks has meant that users are now able to use applications on their phones which access the Internet, including basic functionality such as web browsing. Apart from applications which may be provided by the manufacturer of the phone, a user may also download and install other applications, commonly referred to as "Apps". Other applications provide for social media interactions including for example FACEBOOK™ and TWITTER™, navigation for example GOOGLE MAPS™, games and auction facilities such as eBay™.

Whilst these applications improve the user functionality on smart phone, they can lead to negative consequences on the telecommunications networks from the increase in data being transmitted.

The present application seeks to ameliorate these negative effects.

SUMMARY

Programmers of smart phone applications typically have no experience of mobile networks or their requirements and their experience is based on conventional wired connections where the concept of always on net connections is predominant. Accordingly, they base their mode of operation on this premise. This approach has negative effects on both mobile telephone networks and individual telecommunications devices. The present application provides a method which restricts the access of applications on mobile devices to the Internet. The resulting benefits include reduced network congestion and longer battery life in smart phones.

In a first embodiment, the present application provides a method of controlling access to the Internet on a mobile device. The method comprises the steps of receiving a request to transmit IP data from an application; determining if an IP connection is required to be established for the mobile device to transmit the IP data; and b) upon making a determination that an IP connection is required, determining whether a minimum time period has elapsed and upon determining the minimum time period has elapsed allowing said IP connection to be established. This minimum time period is determined from at least one of a) the time of lapsing of the previous IP connection, and b) the last time the application requested an IP connection.

The minimum time period is suitably a predefined default value. The minimum time period may be a value set for the requesting application with different values set for different applications.

Individual applications may be specified to be set with a minimum period of zero, or otherwise designated, so that access is always permitted. The user of the mobile phone may be allowed to specify the individual applications.

The method may employ a preliminary step of determining whether the application is in the foreground on the device and where the application is determined to be in the foreground allowing the IP connection to be established. By foreground is meant that the application has access to the standard i/o system of the mobile device. Having access to the i/o system allows a user to interact with the application, for example through touch events on a touch screen interface. In contrast, an application operating in the background does not typically allow user interaction.

In one arrangement, if the screen of the mobile device is determined to be switched on the IP connection may be allowed to be established.

The time of lapsing of the previous IP connection may be an estimated value determined as a predetermined period from the time of the last transmission or reception of an IP packet, where the predetermined time is reflective of an estimate of radio tail. Radio tail is the period for which an established radio connection remains after transmission of a final packet. The method may be configured to allow an application which is streaming audio to connect in order to maintain that stream even if the application is not foreground and/or the device screen is turned off.

A signal intervention mechanism may be provided on a mobile device configured to perform these methods. The application also extends to a mobile device employing such a signal intervention mechanism.

DESCRIPTION OF DRAWINGS

The present application will now be described with reference to the drawings in which:

FIG. 1 is an exemplary block diagram illustrating the layers of a mobile device known in the art;

FIG. 2 is an exemplary flow chart of a method of operation of a mobile device known in the art;

DETAILED DESCRIPTION

Figure 3:
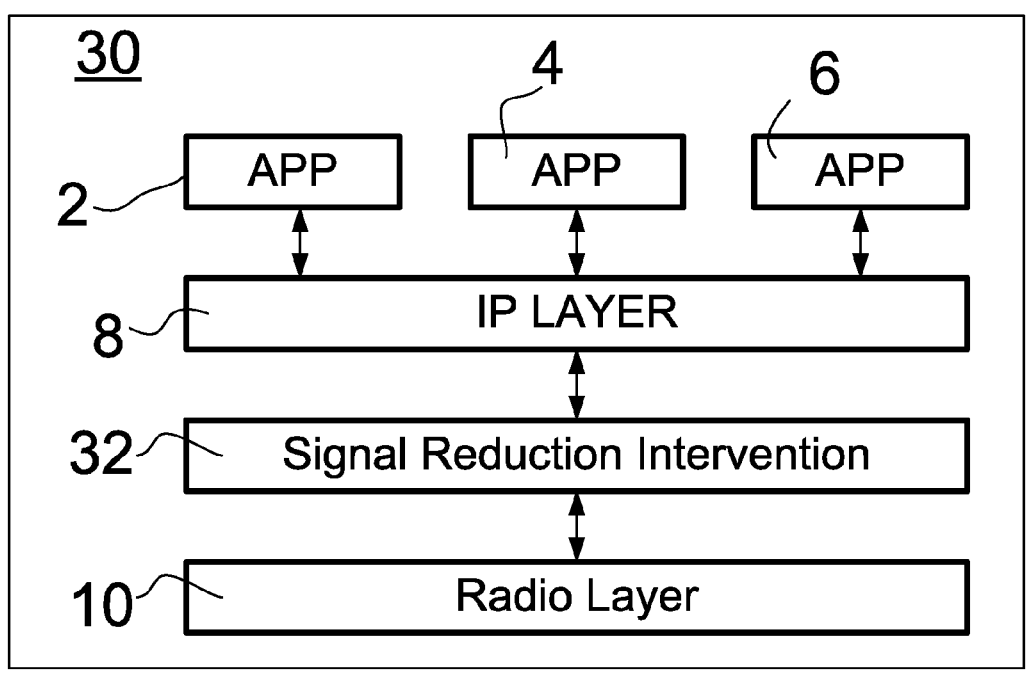
FIG. 3 is an exemplary block diagram illustrating the positioning of a signal reduction mechanism within a device such as that shown in FIG. 1.

The inventors of the present application have identified that applications (apps) frequently installed on smart phones or tablet type devices with a mobile connection are commonly designed to connect at frequent intervals to the internet via the mobile phone network to check for updated information. This constant need to 'connect' causes a lot of network signalling to make and break Internet connection via the Radio interface. Having multiple applications on multiple devices all doing this asynchronously can cause network overloads or require network operators to increase capacity beyond what should be required to support the number of devices on their networks. Moreover, it has been identified that the need to make and break radio connections impacts significantly on the battery life of individual devices.

The applications typically attempt to connect regardless of whether they are in the foreground, i.e. visible or actively in use by to the user. Moreover, it is not uncommon for an application to attempt to make a connection when the screen is turned off and the device is unattended. Some applications allow a user to specify in their settings for that application, certain parameters of the application, including for example how often should a check be made for updates or messages.

However, this does not mean that an application will not make a request for other data. Similarly, it will be appreciated that not all applications provide for such user control and different applications will not necessarily be in sync and thus whilst notionally each of 10 applications might be set to only check each 10 minutes, that conceivably this might result in a check every minute. Moreover, providing a user with functionality to do this does not solve the problem from a network provider's perspective. The present application provides a method for limiting the access of applications on a mobile device to the Internet.

As shown in the simplified diagram of FIG. 1, mobile devices 1 are generally structured into separate layers of functionality. At the bottom, the Radio Layer 10 is responsible through the associated RF circuitry of the mobile device for making and breaking data connections with a mobile telephone network or Wireless (WiFi) network as appropriate and transmitting and receiving data over these networks.

The Applications layer operates on top of the operating system (OS) of the mobile device, which may for example be a Java based. It is common to allow developers to write applications for users and similarly to allow users to install these applications on the mobile device, albeit that both processes may be subject to restrictions. The IP layer acts as the interface between the applications and the radio layer.

A typical process which occurs in existing configurations when an application tries to connect 20 to the Internet is illustrated in FIG. 2. The Radio Layer 22 determines whether there is a radio data connection established on the Radio Network. If a connection exists, then the request from the application is processed 26. If not, the Radio Layer data begins the process of establishing 24 a radio data connection. Once the radio data connection is established the request from the Application is transmitted 26 through the radio network.

In the present application, a mechanism is installed in a mobile device 30 to prevent the establishment of a radio data connection in response to a connection request from an application unless certain requirements are met. More particularly, the signal intervention mechanism 32 (which is suitably installed software code) provides a gatekeeping function, which assesses each attempt by an application to connect to the network to determine whether or not it should be permitted. The signal intervention mechanism may for example be installed by inserting a customised queuing module into the IP routing kernel of the mobile devices software. This customised queuing module may be installed by default in advance of the consumer purchasing their mobile device or installed later. This customised queuing module is suitably configured to pass all outgoing packets through the signal intervention mechanism rather than directly to the outgoing interface.

Accordingly, once the customised queuing module is in place all IP traffic is diverted to the signal intervention mechanism.

Figure 4:
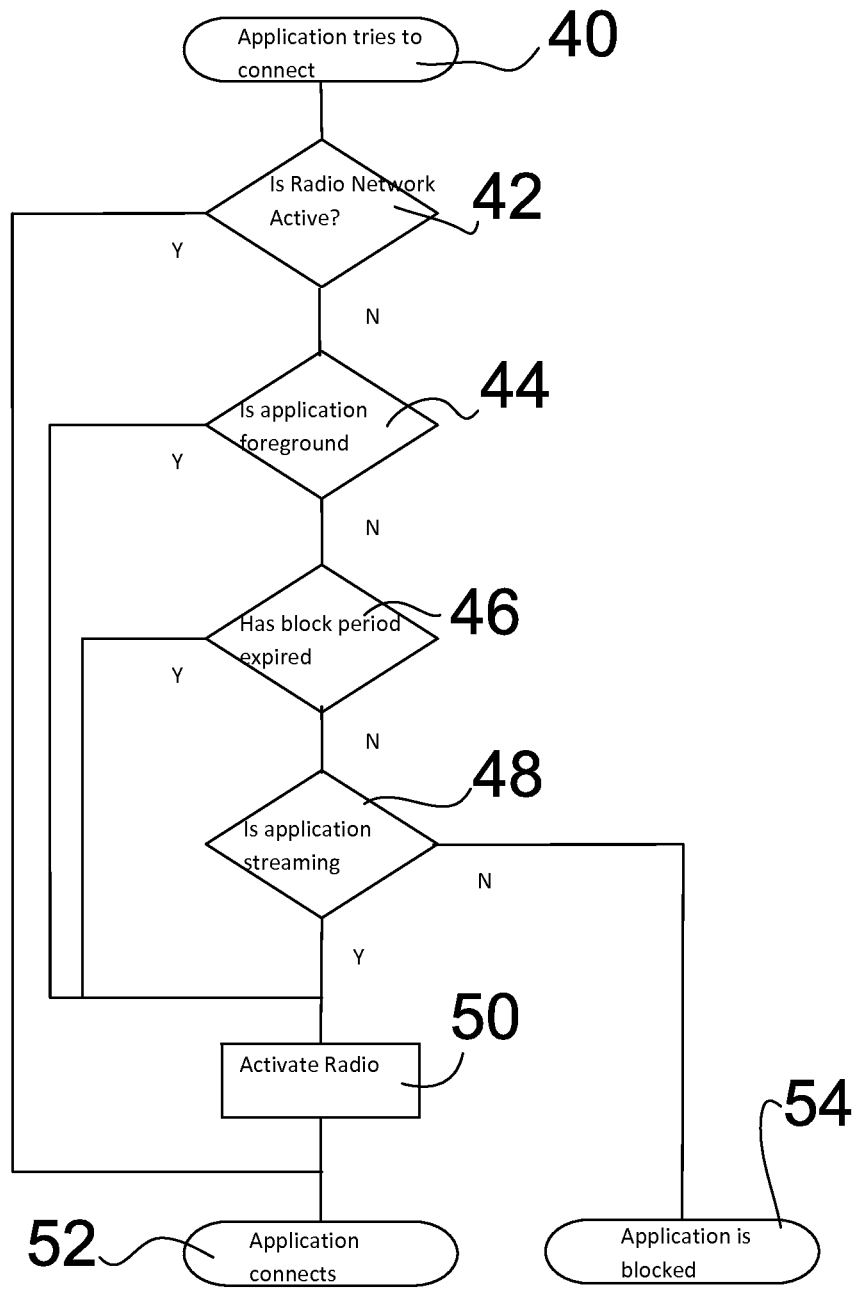
FIG. 4 is a flow chart of an exemplary method of operation of the device with signal reduction mechanism installed.

An exemplary process, shown in FIG. 4, outlines how the signal intervention mechanism 32 arrives at a decision whether to allow 52 or block an application seeking 40 to transmit data.

The first step and primary consideration upon receipt of a request by an application to connect is to determine whether there is an active data connection to the radio network. This is achieved by monitoring outgoing packets and marking the interface as inactive when no packets have been sent for a configurable time interval. A primary timer discussed below is employed to determine whether the configurable time interval has been reached. This primary timer is effectively reset whenever a packet is transmitted. It may take into consideration a predetermined time period reflective of a radio tail, i.e. how long a connection remains in place after transmission of a packet.

If a data connection is active, the applications request is allowed and data transmitted. If however there is no active data connection with radio network, a number of secondary considerations are employed to determine whether an application should be granted access or blocked. These secondary considerations include, for example, but are not limited to:
a) whether or not the application is in the foreground,
b) how long it has been since the device connected, and
c) how long since the particular application connected and whether or not specific rules apply to the application.

The signal intervention mechanism employs a primary timer which is used to measure how long it has been since the device has connected.

Additionally, the signal intervention mechanism employs a number of secondary timers. In one implementation, each App installed on the mobile device which has an ability to connect to a network has an associated secondary timer, which measures the time interval since the individual App last connected.

Thus in the exemplary process of FIG. 4, a check is performed to determine if the application making the request is foreground. This check is unique to the specific application making the request. If the application is not foreground and another application, which is foreground, has connected then because the network connection is already active the not background application will be permitted to connect.

Alternatively, if the network connection is not active and the application is determined to be foreground, then the application request is allowed. In the event that the application is not foreground, a check is performed to determine whether the mobile device or application is within a block period. The check for the block period determines how long it has been since the application or indeed the device itself generally has had an active connection. If the length of time exceeds a predetermined value for a block period, the application's request is allowed. The phone may have a default block period, with individual applications having individual block periods. In the event that there is not a block period in effect, the application's request is allowed to pass. A final check that may be performed is to determine whether an application is streaming, e.g. from an Internet Radio Station. This final check may be performed by monitoring the feature on the phone responsible for playing audio and determining whether this is active. In the event that the application is streaming data, the application's request is allowed to pass.

An advantage of this process is that by suitable configuration, it may be employed by a mobile network operator to minimize traffic congestion.

For example, the signal intervention mechanism, once installed in a phone may retrieve settings from a network operator from a network operator's database. In this way, for example the network operator may configure user's phones with different values for different applications, or indeed different users with different values.

These values may periodically be retrieved by the signal intervention mechanism from a network server and downloading settings. The default actions can be to control each application (other than those listed) or to not control any application other than those listed. Additionally listed applications may be controlled for a different time period that the default settings.

Figure 5:
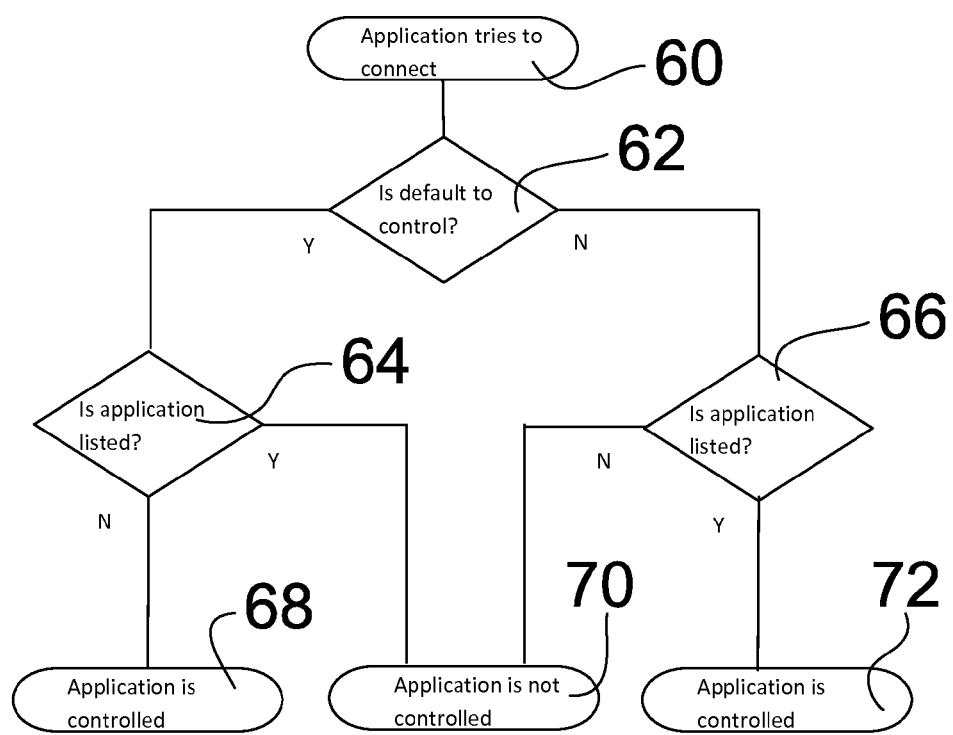
FIG. 5 is a flow chart of an exemplary method of operation employing an application specific configuration.

Thus for example, different applications may be treated differently based on settings retrieved. An exemplary process for this is shown in FIG. 5, in which when an application attempts to create an IP connection 60, a check is made of the settings retrieved from the network operator as to whether the requesting application is required to be controlled, i.e. limited in their access. A mobile device may be configured 62 in either a negative or positive mode. In the positive mode 64, the default is that all applications are controlled 68 and only where an application is listed in a list provided by the network server as being exempt is access automatically allowed 70. In the negative mode 66, the default is that no applications are controlled and only where an application is listed in the list provided by the network operator is access controlled 72. Otherwise the Application is not controlled 70.

The words comprises/comprising when used in this specification are to specify the presence of stated features, integers, steps or components but does not preclude the presence or addition of one or more other features, integers, steps, components or groups thereof.

The invention claimed is:

1. A method of controlling access to the Internet on a mobile device, the mobile device having a radio layer and RF circuitry for making and breaking radio data connections with wireless telephone networks, the method comprising the steps of:
   receiving by a signal intervention mechanism a request to transmit IP data from an application;
   determining if a radio data connection is required to be established for the mobile device to transmit the IP data;
   upon making a determination that a radio data connection is required, determining whether a minimum time period has elapsed from at least one of:
      a) the time of lapsing of the previous radio data connection, and
      b) the last time the application requested to transmit IP data, and upon determining the minimum time period has elapsed allowing said radio data connection to be established.

2. A method according to claim 1, wherein the minimum time period is a predefined default value.

3. A method according to claim 2, wherein the minimum time period is a value set for the requesting application.

4. A method according to claim 3, wherein different values are set for different applications.

5. A method according to claim 4, wherein individual applications may be specified to be set with a minimum period of zero or otherwise designated so that access is always permitted.

6. A method according to claim 5, further comprising allowing a user to specify the individual applications.

7. A method according to claim 1, further comprising a preliminary step of determining whether the application is in the foreground on the device and where the application is determined to be in the foreground allowing the radio data connection to be established.

8. A method according to claim 1, further comprising determining whether the screen of the mobile device is on and where the screen is determined to be on allowing the radio data connection to be established.

9. A method according to claim 1, wherein time of lapsing of the previous radio data connection is an estimated value determined as a predetermined period from the time of the last transmission or reception of an IP packet.

10. A method according to claim 9, where the predetermined period represents an estimate of radio tail.

11. A method according to claim 1, which allows an Application which is streaming audio to connect in order to maintain that stream even if the application is not foreground and/or the device screen is turned off.

12. A mobile device comprising a radio layer and RF circuitry for making and breaking radio data connections with wireless telephone networks and a signal intervention mechanism for controlling access to the Internet through the radio layer and RF circuitry, the signal intervention mechanism being configured in response to receiving a request to transmit IP data from an application;
to:
   determine if a radio data connection is required to be established for the mobile device to transmit the IP data;
   upon making a determination that a radio data connection is required, determine whether a minimum time period has elapsed from at least one of:
      a) the time of lapsing of the previous radio data connection, and
      b) the last time the application requested an radio data connection, and upon determining the minimum time period has elapsed allowing said radio data connection to be established.

13. A mobile device according to claim 12, wherein the minimum time period is a predefined default value.

14. A mobile device according to claim 13, wherein the minimum time period is a value set for the requesting application.

15. A mobile device according to claim 14, wherein different values are set for different applications.

16. A mobile device according to claim 12, wherein the signal intervention mechanism is configured to perform a preliminary step of determining whether the application is in the foreground on the device and where the application is determined to be in the foreground allowing the radio data connection to be established.

17. A mobile device according to claim 12, wherein the signal intervention mechanism is configured to determine whether the screen of the mobile device is on and upon making said determination allowing the IP connection to be established.

18. A mobile device according to claim 12, wherein time of lapsing of the previous radio data connection is an estimated value determined as a predetermined period from the time of the last transmission or reception of an IP packet.

19. A mobile device according to claim 18, where the predetermined period represents an estimate of radio tail.

* * * * *